US010679155B2

(12) United States Patent
Wu et al.

(10) Patent No.: US 10,679,155 B2
(45) Date of Patent: Jun. 9, 2020

(54) DISPATCHING METHOD AND SYSTEM BASED ON MULTIPLE LEVELS OF STEADY STATE PRODUCTION RATE IN WORKING BENCHES

(71) Applicant: Institute For Information Industry, Taipei (TW)

(72) Inventors: Tsung-Lin Wu, Taipei (TW); Wei-Wen Wu, New Taipei (TW); Yin-Jing Tien, Taipei (TW); Yi-Chang Chen, Taipei (TW); Yi-Hsin Wu, New Taipei (TW); Cheng-Juei Yu, New Taipei (TW)

(73) Assignee: Institute For Information Industry, Taipei (TW)

( * ) Notice: Subject to any disclaimer, the term of this patent is extended or adjusted under 35 U.S.C. 154(b) by 147 days.

(21) Appl. No.: 15/791,342

(22) Filed: Oct. 23, 2017

(65) Prior Publication Data

US 2019/0095827 A1 Mar. 28, 2019

(30) Foreign Application Priority Data

Sep. 22, 2017 (TW) ............................ 106132679 A

(51) Int. Cl.
*G06Q 10/00* (2012.01)
*G06Q 10/06* (2012.01)
(Continued)

(52) U.S. Cl.
CPC ..... *G06Q 10/063* (2013.01); *G06F 16/24568* (2019.01); *G06F 16/285* (2019.01);
(Continued)

(58) Field of Classification Search
None
See application file for complete search history.

(56) References Cited

U.S. PATENT DOCUMENTS 5,265,006 A * 11/1993 Asthana ................. G06Q 10/06 705/7.26
7,242,995 B1 * 7/2007 Morgenson .......... G05B 19/418 700/103

(Continued)

FOREIGN PATENT DOCUMENTS

EP 3029617 A1 6/2016

OTHER PUBLICATIONS

Chuzhoy, Julia, Machine Minimiazation for Scheduling Jobs with Interval Constraints, Oct. 2004, University of Pennsylvania Scholarly Commons Department of Computer & Information Science, https://repository.upenn.edu/cgi/viewcontent.cgi?article=1067&context=cis_papers, p. 1-2.*

(Continued)

*Primary Examiner* — Joseph M Waesco
(74) *Attorney, Agent, or Firm* — Skaar Ulbrich Macari, P.A.

(57) ABSTRACT

A dispatching method and system based on multiple levels of steady state production rate in working benches are provided. The dispatching method includes the following steps: receiving a plurality of real-time streaming data regarding a plurality of products being produced by a plurality of productive working benches; grouping the production rate values comprised in each real-time streaming data according to a first data binning technique, so as to produce a first steady state production rate value corresponding to each real-time streaming data; grouping the production rate values comprised in each real-time streaming data according to a second data binning technique, so as to produce a second steady state production rate value corresponding to each real-time streaming data; and determining a dispatching message of a to-be-produced product according to a portion of the first steady state production rate values (Continued)

Receiving a plurality of real-time streaming data — S201

Calculating a plurality of steady state production rate values for each of the real-time streaming data — S202

Determining a dispatching message of a to-be-produced product according to a portion of the first steady state production rate values and a portion of the second steady state production rate values — S203 and a portion of the second steady state production rate values.

16 Claims, 7 Drawing Sheets

(51) Int. Cl.
*G06Q 50/04* (2012.01)
*G06F 16/2455* (2019.01)
*G06F 16/28* (2019.01)

(52) U.S. Cl.
CPC ......... *G06Q 10/06* (2013.01); *G06Q 10/0631* (2013.01); *G06Q 50/04* (2013.01)

(56) References Cited

U.S. PATENT DOCUMENTS 8,082,055 B2 12/2011 Lin et al.
8,503,015 B2 * 8/2013 Gustafson .............. G06Q 10/06 358/1.15
8,538,593 B2 * 9/2013 Sun .......................... H02J 3/00 700/286
2007/0168494 A1 * 7/2007 Liu ........................ G06Q 10/06 709/224
2007/0203606 A1 * 8/2007 Quarg .................... G06Q 10/06 700/121
2010/0195155 A1 * 8/2010 Gustafson .............. G06Q 10/06 358/1.15
2011/0010215 A1 * 1/2011 Lin ........................ G06Q 10/06 705/7.31
2011/0191759 A1 * 8/2011 Andrade ....................... 717/151
2016/0156186 A1 * 6/2016 Sun ........................ G06Q 10/06 700/287
2017/0006135 A1 * 1/2017 Siebel ....................... G06F 8/10
2018/0307731 A1 * 10/2018 Xiao ..................... G06T 11/206

OTHER PUBLICATIONS

Extended European Search Report rendered by the European Patent Office for the European countepart Patent Application No. 17197381.1, dated Jan. 18, 2018, 10 pages.

Office Action rendered by the European Patent Office for the European countepart Patent Application No. 17197381.1, dated May 23, 2019, 9 pages.

* cited by examiner

DISPATCHING METHOD AND SYSTEM BASED ON MULTIPLE LEVELS OF STEADY STATE PRODUCTION RATE IN WORKING BENCHES

PRIORITY

This application claims priority to Taiwan Patent Application No. 106132679 filed on Sep. 22, 2017, which is hereby incorporated by reference in its entirety.

FIELD

The present invention relates to a dispatching method and system based on multiple levels of steady state production rates in working benches. Particularly, the present invention relates to a dispatching method and system based on multiple levels of steady state production rates in working benches generated according to different data binning techniques.

BACKGROUND

With the rapid development of intelligent manufacturing industries, big data analysis and application has become one of key indices for improving the production power, the competitive power, and the innovation power of manufacturing industries. In intelligent manufacturing industries, the capability of effectively analyzing big data and performing production dispatching according to the analysis results not only enables rapid application in various high-tech manufacturing industries (e.g., photoelectric semiconductors) or conventional manufacturing industries, but also can assist the manufacturing industries in reducing the operation and maintenance cost and improving the resource utilization efficiency of factories.

A dispatching method in the conventional manufacturing industries performs dispatching mainly by analyzing similar product orders in a historical database or establishing various kinds of production data models. However, unlike the technology described in the present invention, the conventional dispatching technology does not record multiple levels of steady state production rates of a product in each working bench through different data binning techniques and perform dispatching by comparing multiple levels of steady state production rates of each of a plurality of to-be-produced products and/or a plurality of products in production in the whole factory. Therefore, the conventional technology is likely to be influenced by abnormal data in the historical database and thus cannot provide a more effective, accurate and instant dispatching result.

Accordingly, an urgent need exists in the art to provide a dispatching technology which optimizes the efficiency of the working bench by mastering correlations between the production efficiency of the product on the working bench and the category, product characteristics and materials of the working bench.

SUMMARY

The disclosure includes a dispatching method based on multiple levels of steady state production rates in working benches, which is adapted for a computer. The dispatching method in an example embodiment comprises the following steps (a), (b) and (c). The step (a) is executed to receive a plurality of real-time streaming data, and each of the plurality of real-time streaming data corresponds to one of a plurality of working benches and one of a plurality of product specifications. The step (b) is to execute the following steps on each of the plurality of real-time streaming data: (b1) grouping a plurality of production rate values comprised in the real-time streaming data into a plurality of first groups according to a plurality of overlapped rate intervals of a first data binning technique; (b2) calculating a first steady state production rate value according to the production rate values corresponding to a selected group among the first groups; (b3) grouping the production rate values comprised in the real-time streaming data into a plurality of second groups according to a plurality of non-overlapped rate intervals of a second data binning technique; and (b4) calculating a second steady state production rate value according to the production rate values corresponding to a first portion of the second groups. The step (c) is executed to determine a dispatching message of a to-be-produced product according to a portion of the first steady state production rate values and a portion of the second steady state production rate values.

The disclosure also includes a dispatching system based on multiple levels of steady state production rates in working benches. The dispatching system in one ex ample embodiment comprises a database and a processor, wherein the database and the processor are electrically connected with each other. The processor is configured to receive a plurality of real-time streaming data, and each of the plurality of real-time streaming data corresponds to one of a plurality of working benches and one of a plurality of product specifications. The processor performs the following operations on each of the plurality of real-time streaming data: (a) grouping a plurality of production rate values comprised in the real-time streaming data into a plurality of first groups according to a plurality of overlapped rate intervals of a first data binning technique, (b) calculating a first steady state production rate value according to the production rate values corresponding to a selected group among the first groups, (c) grouping the production rate values comprised in the real-time streaming data into a plurality of second groups according to a plurality of non-overlapped rate intervals of a second data binning technique, and (d) calculating a second steady state production rate value according to the production rate values corresponding to a portion of the second groups. The processor further determines a dispatching message of a to-be-produced product according to a portion of the first steady state production rate values and a portion of the second steady state production rate values.

The dispatching technology (including the system and the method) provided in the present invention groups the production rate values comprised in the real-time streaming data regarding a plurality of products being produced by a plurality of working benches according to different rate intervals defined using two data binning techniques (i.e., a plurality of overlapped rate intervals and a plurality of non-overlapped rate intervals). Through the aforesaid grouping operation, a plurality of steady state production rate values of each product specification in different steady state regions (i.e., levels) on each working bench can be obtained. Thereafter, the dispatching technology of the present invention can select corresponding different levels of steady state production rate values for evaluation and dispatching according to the to-be-produced product specification of the to-be-produced product.

The dispatching technology provided in the present invention can update the number of data, the sum of data, and the sum of squares of data in the groups according to the production rate values comprised in the real-time streaming data when performing the grouping operation on the real-time streaming data. Then, the dispatching technology provided in the present invention may select a first group having a largest number of production rate values as a selected group, and take an average value of the production rate values corresponding to the selected group as a first steady state production rate value. Additionally, the present invention may take an average value of the production rate values corresponding to one or more second groups having the largest number of production rate values as a second steady state production rate value. Through the data binning techniques, the probability of comprising abnormal production rate values in a main steady state region is eliminated, and moreover, the accuracy of the steady state production rate values of each product specification in different steady state regions (i.e., levels) on each working bench can be further improved. Therefore, the dispatching technology of the present invention can further determine the dispatching relationships between one or more to-be-produced products and each working bench based on the steady state production rate values and steady state parameters of each of the product specifications in different steady state regions (i.e., levels) on each working bench that are recorded in the database. According to the dispatching relationships, the dispatching system/method of the present invention can further estimate the production rate and time of each of a plurality of to-be-produced products, and optimize the product dispatching and the manpower scheduling of the whole factory in combination with real-time monitoring of the production status of the products.

The detailed technology and preferred embodiments implemented for the subject invention are described in the following paragraphs accompanying the appended drawings for people skilled in this field to well appreciate the features of the claimed invention.

DETAILED DESCRIPTION

In the following description, a dispatching system and a dispatching method based on multiple levels of steady state production rates in working benches will be explained with reference to example embodiments thereof. However, these example embodiments are not intended to limit the present invention to any example, embodiment, environment, applications or implementations described in these example embodiments. Therefore, description of these example embodiments is only for purpose of illustration rather than to limit the present invention.

It shall be appreciated that, in the following embodiments and the attached drawings, elements unrelated to the present invention are omitted from depiction; dimensions of individual elements and dimensional relationships among the individual elements in the attached drawings are only for illustration, but not to limit the scope of the present invention.

Figure 1A:
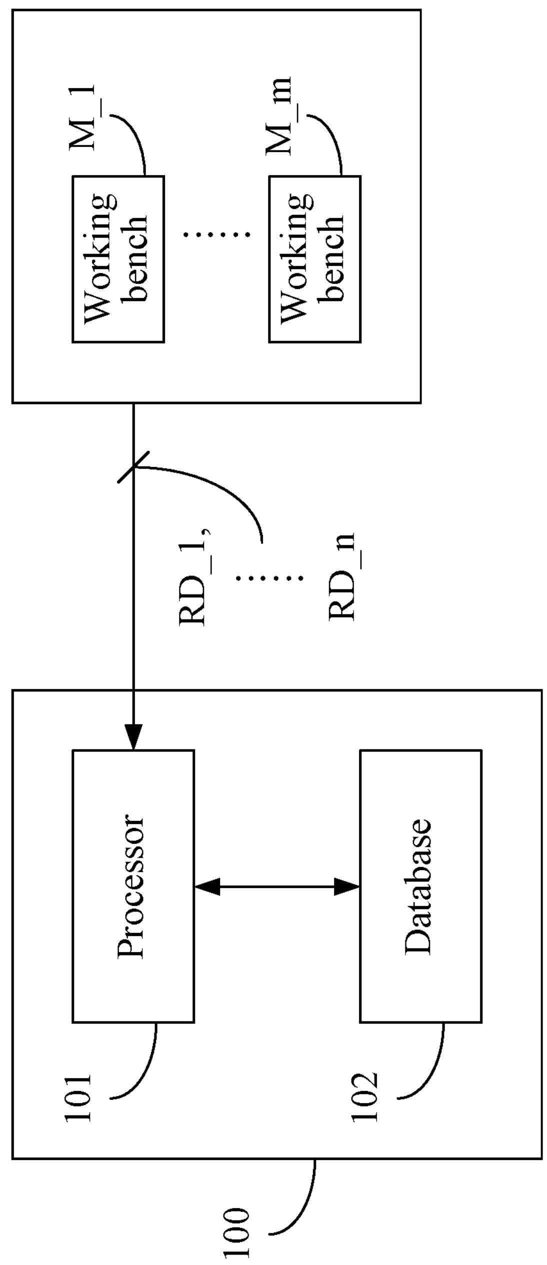
FIG. 1A is a schematic view depicting the architecture of a dispatching system 100 of a first embodiment.

A first embodiment of the present invention is a dispatching system 100 based on multiple levels of steady state production rates in working benches, and a schematic view depicting the architecture thereof is depicted in FIG. 1A. The dispatching system 100 based on multiple levels of steady state production rates in working benches comprises a processor 101 and a database 102 electrically connected to the processor 101. The processor 101 may be any of various processors, central processing units (CPUs), microprocessors, control elements, other hardware elements capable of executing instructions, or other computing devices well known to those of ordinary skill in the art. The database 102 may be a memory, a universal serial bus (USB) disk, a hard disk, a compact disk (CD), a mobile disk, or any other storage medium or circuit with the same function and well known to those of ordinary skill in the art.

The dispatching system 100 may be used in a production operation environment (or other similar environments) having a plurality of working benches M_1, . . . , M_m, and each of the working benches M_1, . . . , M_m can produce products meeting one or more product specifications. Generally speaking, the processor 101 receives a plurality of real-time streaming data RD_1, . . . , RD_n regarding a plurality of products being produced by the working benches M_1, . . . , M_m. Each of the real-time streaming data RD_1, RD_n comprises a plurality of production rate values and corresponds to one of the working benches M_1, . . . , M_m and one of a plurality of product specifications. In other words, each of the real-time streaming data RD_1, . . . , RD_n comprises the production rate values regarding a product meeting one of the product specifications being produced by one of the working benches M_1, . . . , M_m. The processor 101 performs the grouping operation on each of the real-time streaming data RD_1, . . . , RD_n through several data binning techniques, and determines a plurality of steady state production rate values and a plurality of steady state parameters when each of the working benches M_1, . . . , M_m produces products meeting the product specifications according to results of the grouping operation. Thereafter, the dispatching system 100 can determine a dispatching message of a to-be-produced product according to a portion of the steady state production rate values and even according to a portion of the steady state parameters.

Figure 1B:
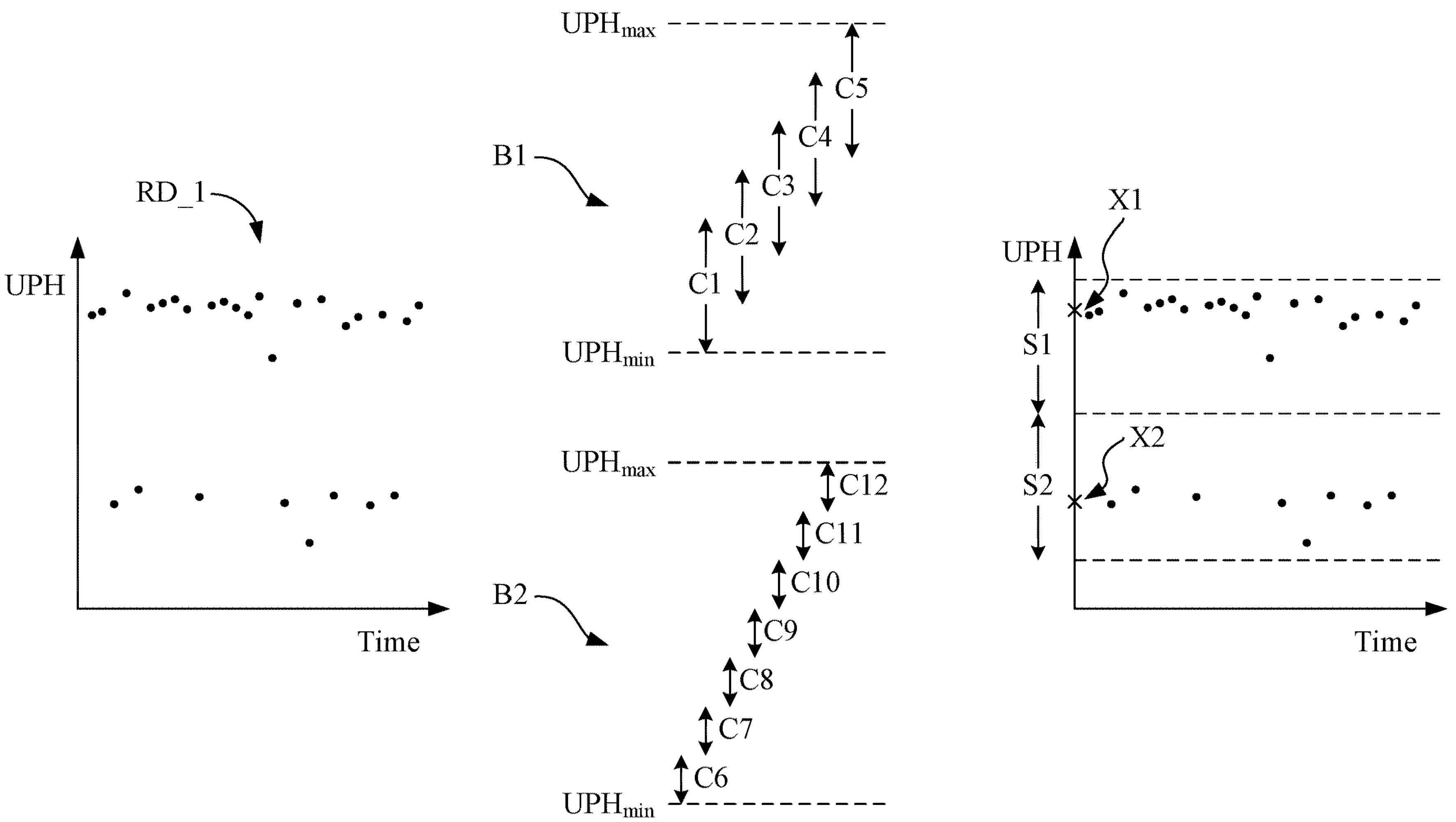
FIG. 1B is a schematic view depicting the dispatching system 100 performing grouping operation on real-time streaming data RD_1 and generating two steady state regions through the first and second data binning techniques.

Here, the real-time streaming data RD_1 is taken as an example for illustrating how the dispatching system 100 performs the grouping operation on the real-time streaming data RD_1 through several (e.g., two) data binning techniques, and a schematic view thereof is depicted in FIG. 1B.

The left side of FIG. 1B is a schematic view illustrating the distribution of the production rate values comprised in the real-time streaming data RD_1, wherein the horizontal axis represents time, the vertical axis represents the production rate value, and the production rate value is unit per hour (UPH). Each black dot in the schematic view of distribution represents a production rate value comprised in the real-time streaming data RD_1. The processor 101 groups the production rate values comprised in the real-time streaming data RD_1 respectively using a plurality of overlapped rate intervals C1, C2, C3, C4 and C5 (which will be detailed later) of a first data binning technique B1 and a plurality of non-overlapped rate intervals C6, C7, C8, C9, C10, C11 and C12 (which will be detailed later) of a second data binning technique B2. After grouping the production rate values through the first data binning technique B1, the processor 101 can find a first steady state region S1 (which will be detailed later) according to the result of the grouping operation, and calculate a steady state production rate value X1 according to the production rate values (e.g., an average value of the production rate values) corresponding to the first steady state region S1. The processor 101 determines a second steady state region S2 (which will be detailed later) according to the first steady state region S1, and then calculates a steady state production rate value X2 according to the production rate values (which may be obtained through the second data binning technique B2) corresponding to the second steady state region S2. The processor 101 may additionally calculate the steady state parameter of each of the first steady state region S1 and the second steady state region S2. Thereafter, the processor 101 records the steady state production rate values X1 and X2 and the steady state parameters in the database 102.

Figure 1C:
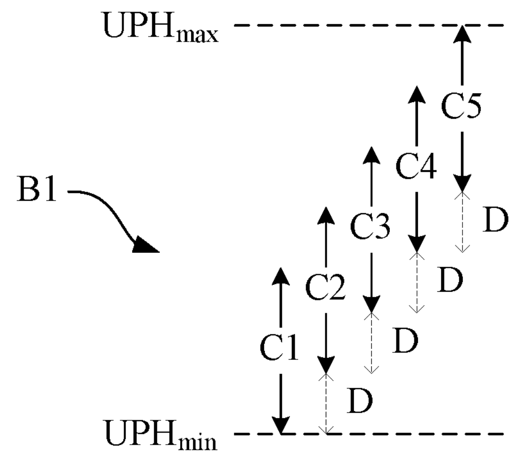
FIG. 1C is a schematic view depicting a plurality of overlapped rate intervals of the first data binning technique.

A schematic view of the overlapped rate intervals C1 to C5 of the first data binning technique B1 is depicted in FIG. 1C. The first data binning technique B1 defines the overlapped rate intervals C1 to C5 between a maximum production rate value $UPH_{max}$ and a minimum production rate value $UPH_{min}$, and each of the overlapped rate intervals C1 to C5 has a first interval length (i.e., the length of each of the overlapped rate intervals C1 to C5 is the first interval length), the overlapped rate intervals C1 to C5 present a sequence, and every two adjacent ones of the overlapped rate intervals C1 to C5 in this sequence are overlapped with each other by a movement distance D (e.g., the overlapped rate interval C1 is overlapped with the overlapped rate interval C2 and staggered with the overlapped rate interval C2 by a movement distance D).

Figure 1D:
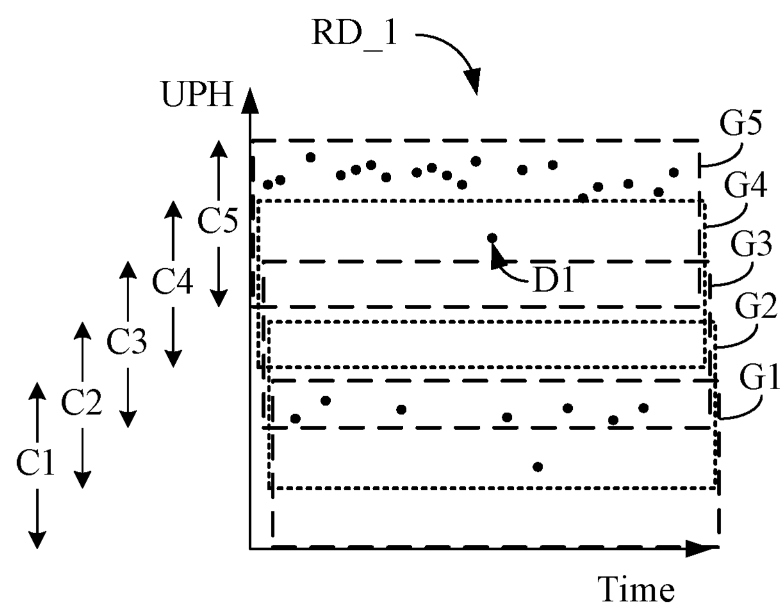
FIG. 1D is a schematic view depicting the grouping operation on the real-time streaming data according to the plurality of overlapped rate intervals of the first data binning technique.

The processor 101 groups the production rate values comprised in the real-time streaming data RD_1 into a plurality of first groups G1, G2, G3, G4 and G5 according to the overlapped rate intervals C1 to C5, as shown in FIG. 1D. Specifically, if one production rate value falls within one or more of the overlapped rate intervals C1 to C5, then the production rate value belongs to the first group corresponding to the one or more overlapped rate intervals. For example, the production rate value D1 is grouped into a first group G4 corresponding to the overlapped rate interval C4 and a first group G5 corresponding to the overlapped rate interval C5. The processor 101 also calculates the number of data (i.e., the number of the production rate values) in each of the first groups G1 to G5 when performing the grouping operation through the first data binning technique B1. In some embodiments, the processor 101 further calculates the sum of the data (i.e., the sum of the production rate values) and the sum of squares of the data (i.e., the sum of squares of the production rate values) in each of the first groups G1 to G5.

In the exemplary example shown in FIG. 1D, the number of data falling within the first group G5 is the largest, so the processor 101 takes the overlapped rate interval C5 corresponding to the first group G5 as the first steady state region S1, and takes the first group G5 as the selected group. Next, the processor 101 calculates a steady state production rate value X1 according to the production rate values (e.g., takes an average value of the production rate values) corresponding to the selected group (i.e., the first group G5). It shall be appreciated that, the processor 101 may perform operation on the real-time streaming data RD through a data classification method so as to determine the length of the overlapped rate intervals C1 to C5, and the data classification method includes Bucket, Quantile and Optimal Binning.

Figure 1E:
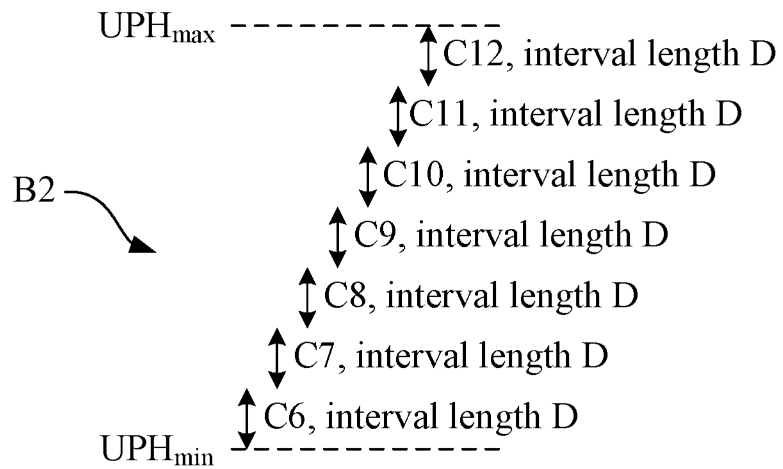
FIG. 1E is a schematic view depicting a plurality of non-overlapped rate intervals of the second data binning technique.

A schematic view of the non-overlapped rate intervals C6 to C12 of a second data binning technique B2 is depicted in FIG. 1E. The second data binning technique B2 defines the non-overlapped rate intervals C6 to C12 between a maximum production rate value $UPH_{max}$ and a minimum production rate value $UPH_{min}$, wherein each of the non-overlapped rate intervals C6 to C12 has a second interval length (i.e., the length of each of the non-overlapped rate intervals C6 to C12 is the second interval length), and the second interval length is the movement distance D in the first data binning technique B1.

Figure 1F:
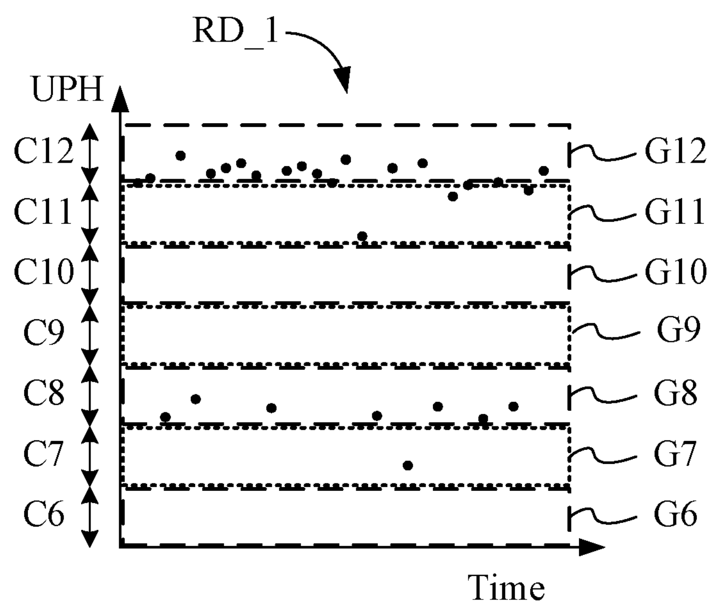
FIG. 1F is a schematic view depicting the grouping operation on the real-time streaming data according to the plurality of non-overlapped rate intervals of the second data binning technique.

Accordingly, the processor 101 groups the production rate values comprised in the real-time streaming data RD_1 into a plurality of second groups G6, G7, G8, G9, G10, G11 and G12 according to the non-overlapped rate intervals C6 to C12, as shown in FIG. 1F. Specifically, if one production rate value falls within one of the non-overlapped rate intervals C6 to C12, then the production rate value belongs to the second group corresponding to the one of the non-overlapped rate intervals. The processor 101 also calculates the number of data (i.e., the number of the production rate values) in each of the second groups G6 to G12 when performing the grouping operation through the second data binning technique B2. In some embodiments, the processor 101 further calculates the sum of the data (i.e., the sum of the production rate values) and the sum of squares of the data (i.e., the sum of squares of the production rate values) in each of the second groups G6 to G12.

Figure 1G:
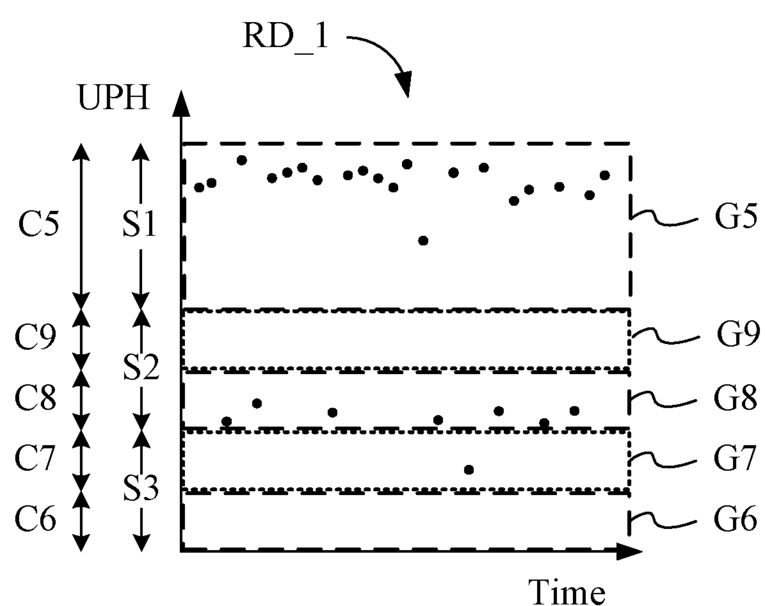
FIG. 1G is a schematic view depicting a first steady state region, a second steady state region and a third steady state region of the first embodiment.

The processor 101 determines a second steady state region S2 according to other non-overlapped rate intervals except for the first steady state region S1, and even determines more other steady state regions (optionally). For example, the processor 101 may select one or more non-overlapped rate intervals corresponding to a largest (larger) number of production rate values, among other non-overlapped rate intervals except for the first steady state region S1, as the second steady state region S2. In case where several non-overlapped rate intervals except for the first steady state region S1 correspond to the same number of production rate values, the processor 101 may select the non-overlapped rate interval having higher production rate values as the second steady state region S2. In this embodiment, the processor 101 further determines a third steady state region S3 according to other non-overlapped rate intervals. Please refer to the first steady state region S1, the second steady state region S2 and the third steady state region S3 depicted in FIG. 1G for ease of understanding. The second steady state region S2 consists of the non-overlapped rate intervals C8 and C9, the third steady state region S3 consists of the non-overlapped rate intervals C6 and C7, and the number of the production rate values corresponding to the second steady state region S2 is larger than the number of the production rate values corresponding to the third steady state region S3.

The processor 101 calculates the steady state production rate value X1, the steady state production rate value X2, and the steady state production rate value X3 respectively of the first steady state region S1, the second steady state region S2 and the third steady state region S3. In some embodiments, the processor 101 further calculates the steady state parameter (which may include a probability value and a standard deviation) of each of the first steady state region S1, the second steady state region S2 and the third steady state region S3. As described previously, the processor 101 calculates the number of data in each of the groups (including the first and the second groups), and also calculates the sum of the data (i.e., the sum of the production rate values) and the sum of squares of the data (i.e., the sum of squares of the production rate values) in each of the groups (including the first and the second groups) in some embodiments. In those embodiments, the processor 101 may calculate the steady state production rate value, the probability value and the standard deviation of each of the steady state regions according to these values. Here, the second steady state region S2 is taken as example for ease of understanding. The processor 101 may calculate the steady state production rate value X2 of the second steady state region S2 according to the following equation (1), calculate the probability value of the second steady state region S2 according to the following equation (2), and calculate the standard deviation of the second steady state region S2 according to the following equation (3).

$$\text{Steady state production rate value } X2 = \frac{N}{\sum_{i=8}^{9} ni}, \quad \text{wherein } N = \sum_{i=5}^{9} n_i \tag{1}$$

$$\text{Probability value} = \frac{\sum_{i=2}^{7} s_i}{N} := \mu \tag{2}$$

$$\text{Standard deviation} = \sqrt{\frac{\sum_{i=2}^{7} ss_i - N\mu^2}{N-1}} \tag{3}$$

In the aforesaid equations (1) to (3), the parameter $n_i$ represents the number of the data in the $G_i$ group, the parameter $s_i$ represents the sum of the data in the $G_i$ group, and the parameter $ss_i$ represents the sum of squares of the data in the $G_i$ group.

The processor 101 records the aforesaid steady state production rate values X1 to X3 and the steady state parameters in the database 102 for later use in determining the dispatching message of the to-be-produced product. It shall be appreciated that, although the present invention only takes the real-time streaming data RD_1 as an example for illustrating how the dispatching system 100 performs grouping on the real-time streaming data RD_1 through the two data binning techniques in the above descriptions, the dispatching system 100 will perform the grouping and operation on other real-time streaming data with the same technological means and record the steady state production rate values X1 to X3 and the steady state parameters generated according to other real-time streaming data in the database 102. It shall be appreciated that, since each of the real-time streaming data RD_1, . . . , RD_n corresponds to one of the working benches M_1, . . . , M_m and one of the product specifications, each of the first steady state production rate values corresponds to one of the working benches M_1, . . . , M_m and one of the product specifications, each of the second steady state production rate values corresponds to one of the working benches M_1, . . . , M_m and one of the product specifications, and each of the third steady state production rate values corresponds to one of the working benches M_1, . . . , M_m and one of the product specifications.

Next, how the dispatching system 100 of the present invention determines a dispatching message of a to-be-produced product will be described, and the dispatching message may comprise a working bench corresponding to the to-be-produced product. The processor 101 may select one of the product specifications as a reference specification of the to-be-produced product by comparing the product specifications recorded in the database 102 with a to-be-produced product specification of the to-be-produced product. The processor 101 then determines a first estimated production rate value, a second estimated production rate value and a third estimated production rate value of the to-be-produced product on each of the working benches according to the first steady state production rate values, the second steady state production rate values and the third steady state production rate values corresponding to the reference specification (i.e., by a learning method which includes a regression method, a K-nearest neighbors algorism, a machine learning algorithm).

The processor 101 may further determine an estimated steady state parameter of the to-be-produced product in each of the working benches according to the steady state parameters corresponding to the reference specification. Thereafter, the processor 101 determines the dispatching message according to the first estimated production rate values, the second estimated production rate values and the third estimated production rate values, and even according to the estimated steady state parameters. It shall be appreciated that, the aforesaid product specifications may include the size, the material of the product or other product attributes/features. The processor 101 may select the reference specification of the to-be-produced product according to a regression method, an interpolation method or other similarity analysis methods.

In some embodiments, the processor 101 performs the following operations on each of the working benches: (a) calculating an estimated production time of the to-be-produced product on the working bench according to the first estimated production rate value, the second estimated production rate value and the third estimated production rate value of the working bench, and (b) determining an estimated completion time point according to the estimated production time, a start production time point and a setup time of the working bench. Thereafter, the processor 101 determines a corresponding working bench comprised in the dispatching message of the to-be-produced product according to the estimated completion time points. For example, the processor 101 may dispatch the to-be-produced product to the working bench corresponding to the minimum estimated production time for production. As another example, the processor 101 may also dispatch the to-be-produced product to the working bench corresponding to the earliest estimated completion time point for production.

For ease of understanding, the estimated production rate values and the probability values in the steady state parameters of the to-be-produced product j in steady state regions (levels) on the working bench m are listed in table 1 hereby. Here it is assumed that the number of the to-be-produced product j is $N_j$, the time point where the working bench m can start to produce the product that has not yet been dispatched is $q^m$, the last product that has been produced in the production line is $i_m$, and the setup time required for changing from producing the product $i_m$ to producing the to-be-produced product j is $s_{i_m j}^{m}$. Then, the processor 101 may calculate the estimated production time $p_j^m$ of the to-be-produced product j on the working bench m according to the following equation (4), and may calculate the estimated completion time point $c_j^m$ of the to-be-produced product j on the working bench m according to the following equation (5).

TABLE 1

| Steady state regions (levels) | Probability values comprised in the estimated steady state parameters | Estimated production rate values |
|---|---|---|
| 1 | $P_{j1}^m$ | $v_{j1}^m$ |
| 2 | $P_{j2}^m$ | $v_{j2}^m$ |
| 3 | $P_{j3}^m$ | $v_{j3}^m$ |

$$p_j^m = \frac{p_{j_1}^m \times N_j}{v_{j_1}^m} + \frac{p_{j_2}^m \times N_j}{v_{j_2}^m} + \frac{p_{j_3}^m \times N_j}{v_{j_3}^m} \tag{4}$$

$$c_j^m = q^m + s_{imj+}^m p_j^m \tag{5}$$

As described above, after calculating the estimated production time $p_j^m$ and the estimated completion time point $c_j^m$r the processor 101 may dispatch the to-be-produced product j to the working bench corresponding to the minimum estimated production time $p_j^m$ for production, or dispatch the to-be-produced product j to the working bench corresponding to the earliest estimated completion time point $c_j^m$ for production.

In another embodiment, the dispatching system 100 intends to produce a plurality of kinds of to-be-produced products. The processor 101 first obtains a plurality of estimated production times $p_j^m$ of the to-be-produced products according to the aforesaid equations (4) and (5). Next, the processor 101 performs operation on the estimated production times $p_j^m$ through an estimation method, thereby obtaining the dispatching messages of the to-be-produced products (including a working bench, a dispatching sequence and an estimated production capacity value corresponding to each of the to-be-produced products), and the estimation method may be a mixed integer programming model or any of various heuristic algorithms (e.g., a genetic algorithm). For example, the processor 101 may calculate the working bench, the dispatching sequence and the estimated production capacity value corresponding to each of the to-be-produced products according to the following equation (6):

$$\text{minimize} \sum_{j\in\mathcal{J}} T_j \tag{6}$$

The following conditions must be satisfied when the processor 101 is solving the equation (6):

$$\sum_{m\in\mathcal{M}} \sum_{i\in B_j^m\cup\{0\}} x_{ij}^m = 1, \forall j\in\mathcal{J} \qquad \text{Condition (a)}$$

$$\sum_{j\in\mathcal{J}} x_{oj}^m \le 1, \forall m\in\mathcal{M} \qquad \text{Condition (b)}$$

$$\sum_{i\in B_j^m\cup\{0\}} x_{ij}^m = \sum_{i\in A_j^m\cup\{n+1\}} x_{ij}^m, \forall j\in\mathcal{J}, m\in\mathcal{M} \qquad \text{Condition (c)}$$

$$B_j \ge r_j, \forall j\in\mathcal{J} \qquad \text{Condition (d)}$$

$$B_j \ge q^m - (1-x_{0j}^m)M, \forall j\in\mathcal{J}, m\in\mathcal{M} \qquad \text{Condition (e)}$$

$$B_j \ge C_j - (1-x_{ij}^m)M, \forall i,j\in\mathcal{J}, m\in\mathcal{M} \qquad \text{Condition (f)}$$

$$c_j \ge B_j + s_{ij}^m + p_j^m - (1-x_{ij}^m)M, \forall i,j\in J, m\in M \qquad \text{Condition (g)}$$

$$T_j \ge C_j - d_j, \forall j\in\mathcal{J} \qquad \text{Condition (h)}$$

$$T_j \ge 0, \forall j\in\mathcal{J} \qquad \text{Condition (i)}$$

$$x_{ij}^m \in \{0,1\}, \forall j\in\mathcal{J}\cup\{0\}, j\in\mathcal{J}\cup\{n+1\}, m\in\mathcal{M} \qquad \text{Condition (j)}$$

The above equation (6) means that under the limitation of the condition (a) to condition (j), optimal combinations between the to-be-produced products and the working benches are obtained (i.e., the working bench and the dispatching sequence corresponding to each of the to-be-produced products are obtained) after the sum of time exceeding the due date of each of all to-be-produced products (i.e., to-be-dispatched products) on each of the working benches is minimized. In this way, according to the aforesaid optimal combinations and the estimated production rate values of each to-be-produced product in steady state regions on each working bench, the dispatching system of the present invention can calculate the estimated production capacity value, including the number of to-be-produced products produced on each working bench per unit time, the production time of each to-be-produced product on each working bench, the degree of use of each working bench, or the like.

The condition (a) means that each product j happens to be dispatched to a first position on one working bench m or produced after a certain product. The condition (b) means that there is only one product at most at a first dispatched position on each working bench m. The condition (c) means that if the product j is dispatched to the first position on the working bench m or produced after a certain product, then the product j may also be produced at the last position on the working bench m or before a certain product. The condition (d) means that the start processing time point of each product j is behind the release date of the product. The condition (e) means that if the product j is dispatched to the first position on the working bench m, then the start processing time point of the product j on the working bench m is behind the start processing time point of the working bench m. The condition (f) means that if the product j is dispatched to be produced after the product i on the working bench m, then the start processing time point of the product j on the working bench m is behind the production completion time point of the product i. The condition (g) means that if the product j is dispatched to be produced after the product i on the working bench m, then the completion time point of the product j is behind the sum of the release date and the setup time and the production time of the product j. Moreover, the conditions (h) and (i) mean that for each product j, the time exceeding the due date is the larger one of 0 and the time obtained by subtracting the due date from the completion time point. The condition (j) means the dispatching variable of the working bench and/or the product may have a value of 0 or 1.

The parameters used in the above equation (6) and the conditions (a) to (j) are described hereby. The parameter $\mathcal{J}$ represents a set of the to-be-dispatched products (i.e., the to-be-produced products), and the parameter $\mathcal{M}$ represents a set of the working benches. The parameter $r_j$ represents the release date in this station (plant area) of the product j, $\forall j\in\mathcal{J}$. The parameter $d_j$ represents the due date in this station (plant area) of the product j, $\forall j\in\mathcal{J}$. The parameter $p_j^m$ represents the processing time of the product j on the working bench m, $\forall j\in\mathcal{J}, m\in\mathcal{M}$. The parameter $s_{ij}^m$ represents the setup time required for changing from producing the product i to producing the product j on the working bench m, $\forall i,j\in\mathcal{J}, m\in\mathcal{M}$. The parameter $q^m$ represents the time point where the working bench m can start to produce the product set $\mathcal{J}$, $\forall m\in\mathcal{M}$. The parameter $\mathcal{A}_j^m=\{i\in\mathcal{J}\,|$the product i may be produced right after the product j on the working bench m}, $\forall j \in \mathcal{J}, m \in \mathcal{M}$. The parameter $\mathcal{B}_j^m = \{i \in \mathcal{J} \mid$ the product i may be produced right before the product j on the working bench m}, $\forall j \in \mathcal{J}, m \in \mathcal{M}$. Additionally, in some embodiments, the parameter M may be represented by the following equation:

$$M = \max_{m \in \mathcal{M}} q^m + \max_{j \in \mathcal{J}} r_j + \sum_{m \in \mathcal{M}, i \in \mathcal{J}, j \in \mathcal{J}} s_{ij}^m + \sum_{m \in \mathcal{M}, j \in \mathcal{J}} p_j^m$$

Moreover, meanings of the parameter $x_{ij}^m$, the parameter $x_{0j}^m$ and the parameter $x_{j,n+1}^m$ are as follows:

$$x_{ij}^m = \begin{Bmatrix} 1, & \text{product } j \text{ is produced right after} & \\ & \text{product } i \text{ on working bench } m & , \forall j \in \mathcal{J}, m \in \mathcal{M} \\ 0, & \text{not the above case} & \end{Bmatrix}$$

$$x_{0j}^m = \begin{Bmatrix} 1, & \text{product } j \text{ is the first product in} & \\ & \text{product set } \mathcal{J} \text{ on working bench } m, & \forall j \in \mathcal{J}, m \in \mathcal{M} \\ 0, & \text{not the above case} & \end{Bmatrix}$$

$$x_{j,n+1}^m = \begin{Bmatrix} 1, & \text{product } j \text{ is the last product in} & \\ & \text{product set } \mathcal{J} \text{ on working bench } m, & \forall j \in \mathcal{J}, m \in \mathcal{M} \\ 0, & \text{not the above case} & \end{Bmatrix}$$

Moreover, the parameter $B_j$ represents the start production time point of the product j (including the setup and the production time), $\forall j \in \mathcal{J}$. The parameter $C_j$ represents the production completion time point of the product j, $\forall j \in \mathcal{J}$. The parameter $T_j$ represents the time exceeding the due date of the product j, $\forall j \in \mathcal{J}$.

In another embodiment, if an additional order of to-be-produced products is inserted into the original production sequence in the plant area, then the dispatching system 100 of the present invention may use the processor 101 and the database 102 thereof to execute the aforesaid procedure so as to obtain the dispatching message of the additional order of to-be-produced products. The dispatching system 100 may also increase the weight of the additional order of to-be-produced products in the aforesaid limiting conditions, thereby giving priority to the additional order of to-be-produced products to meet the due date thereof.

As can be known from the above descriptions, the dispatching system 100 provided in the present invention performs the grouping operation on the real-time streaming data according to different rate intervals defined using two data binning techniques (i.e., a plurality of overlapped rate intervals and a plurality of non-overlapped rate intervals). Each of the real-time streaming data comprises the production rate values when a product meeting a certain production specification being produced by a working bench. Through the aforesaid grouping operation, a plurality of steady state production rate values of each product specification in different steady state regions (i.e., levels) on each working bench can be obtained. Thereafter, the dispatching system 100 can select corresponding different levels of steady state production rate values for evaluation and dispatching according to the to-be-produced product specification of the to-be-produced product.

When the grouping operation is performed on each of the real-time streaming data, the plurality of production rate values of the real-time streaming data enter in succession. For each of the production rate values, the dispatching system 100 determines the production rate value belonging to which groups according to a plurality of overlapped rate intervals and a plurality of non-overlapped rate intervals, and then updates the number of data, the sum of the data, and the sum of squares of the data in each of the groups. After the grouping on the real-time streaming data is completed, the dispatching system 100 can determine several steady state regions (i.e., levels), and then calculate the steady state production rate values and even other steady state parameters of each of the steady state regions according to the number of data, the sum of the data, and the sum of squares of the data in the groups. Through recording the number of data, the sum of the data, and the sum of squares of the data in each of the groups, the amount of data that need to be stored may be reduced, and moreover, the efficiency in the subsequent calculation of the steady state production rate values may be improved. Additionally, through the data binning techniques, the probability of comprising abnormal production rate values in a main steady state region (i.e., corresponding to the group having a largest number of production rate values, e.g., the first steady state region S1) is eliminated, and moreover, the accuracy of the steady state production rate values of each product specification in different steady state regions on each working bench can be further improved.

Through the aforesaid operations and the stored data, the dispatching system 100 of the present invention can further determine the dispatching relationships between one or more to-be-produced products and each working bench based on the steady state production rate values and steady state parameters of each product specification in different steady state regions on each working bench that are recorded in the database. According to the dispatching relationships, the dispatching system of the present invention can further estimate the production rate and time of a plurality of to-be-produced products, and optimize the product dispatching and the manpower scheduling of the whole factory in combination with real-time monitoring of the production status of the products.

Figure 2A:
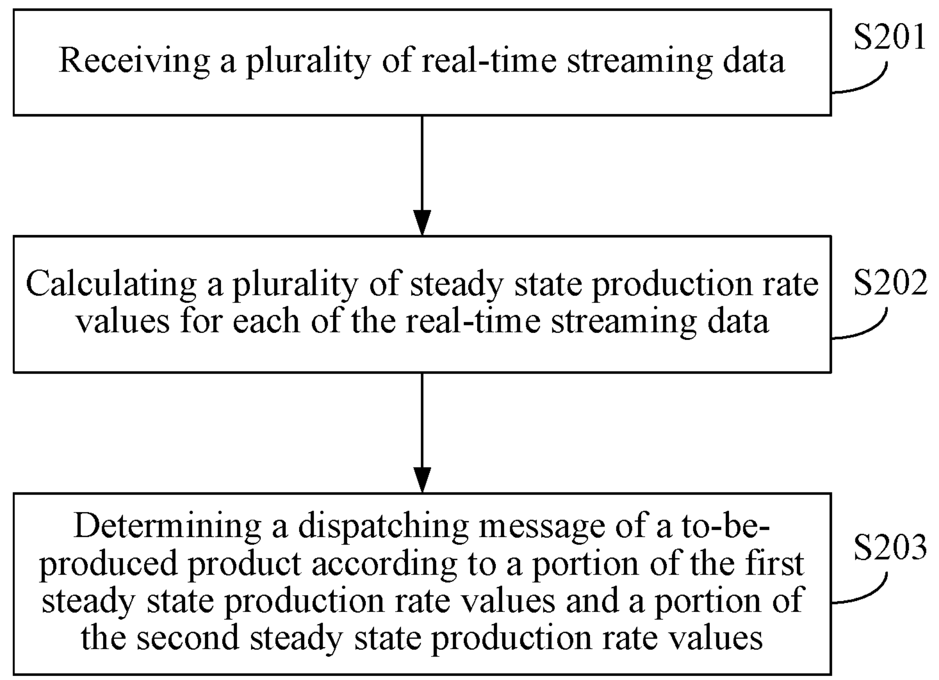
FIG. 2A is a flowchart diagram depicting a dispatching method according to a second embodiment.

A second embodiment of the present invention is a dispatching method based on multiple levels of steady state production rates in working benches, and a flowchart diagram thereof is depicted in FIG. 2. The dispatching method is adapted for a dispatching system (e.g., the dispatching system 100 of the first embodiment) which may be implemented by a computer, an electronic computing apparatus or other similar apparatuses having the computing capability.

First, in step S201, a plurality of real-time streaming data is received by the dispatching system, and each of the plurality of real-time streaming data corresponds to one of a plurality of working benches and one of a plurality of product specifications. Specifically, each of the plurality of real-time streaming data comprises a plurality of production rate values when one of the working benches is producing products satisfying a certain product specification. Next, in step S202, a plurality of steady state production rate values are calculated by the dispatching system for each of the real-time streaming data.

Figure 2B:
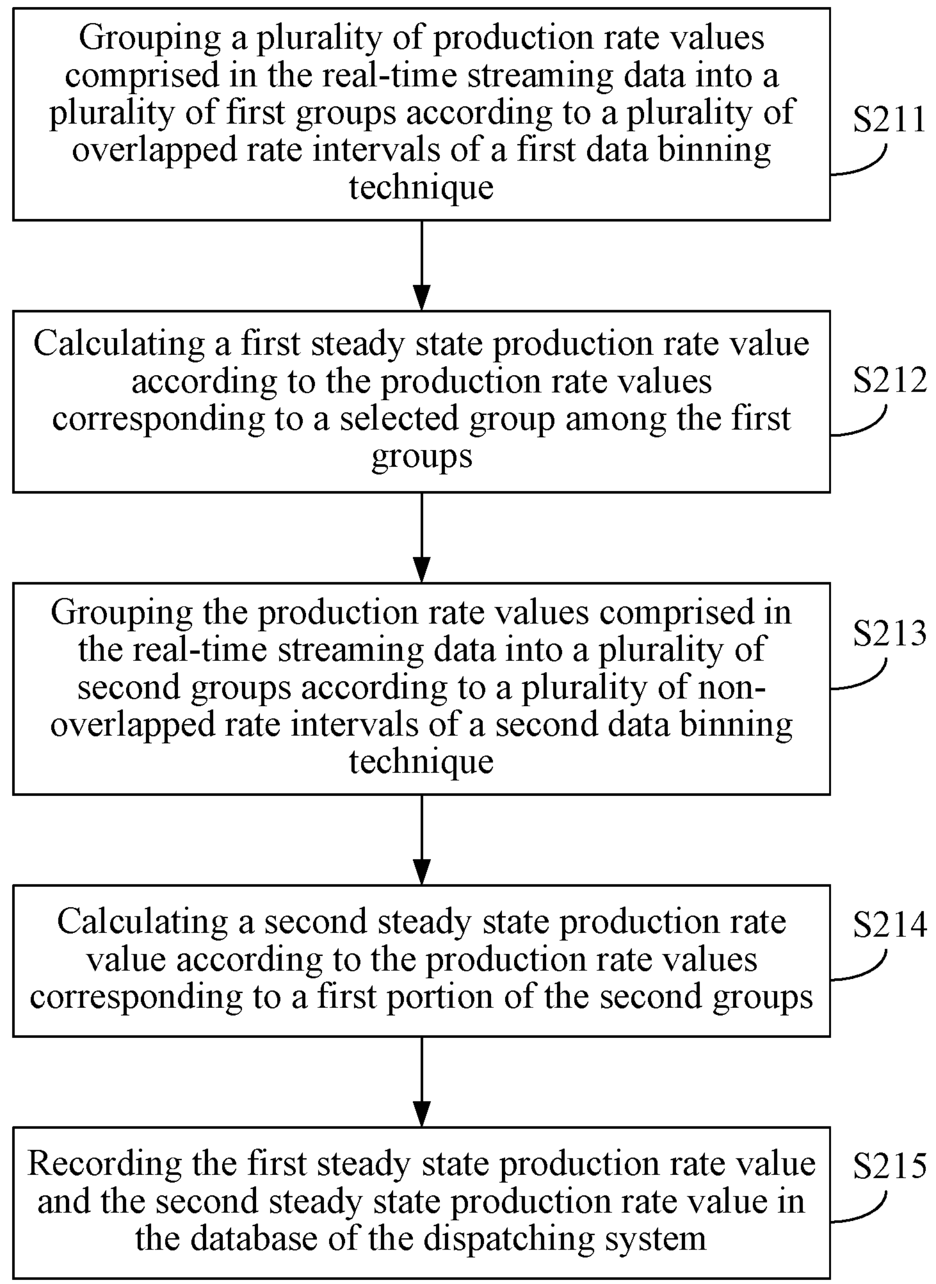
FIG. 2B is a detailed flowchart diagram of step S202.

In this embodiment, the step S202 is to execute the procedures depicted in FIG. 2B on each of the plurality of real-time streaming data. In step S211, a plurality of production rate values comprised in the real-time streaming data is grouped into a plurality of first groups by the dispatching system according to a plurality of overlapped rate intervals of a first data binning technique. Specifically, each of the overlapped rate intervals has a first interval length, the overlapped rate intervals present a sequence, and every two adjacent ones of the overlapped rate intervals in this sequence are overlapped with each other by a movement distance. When performing the grouping operation on the real-time streaming data according to the overlapped rate intervals, the step S211 determines each production rate value falling within which one or ones of the overlapped rate intervals, and then determines that the production rate value belongs to the first group corresponding to the one or ones of the overlapped rate intervals according to the determination result. During the executing of the step S211, the dispatching system also calculates the number of data (i.e., the number of production rate values) in each of the first groups.

Next, in step S212, a first steady state production rate value is calculated according to the production rate values corresponding to a selected group among the first groups. The overlapped rate interval corresponding to the selected group may be regarded as a first steady state region. Specifically, the step S212 determines which one among the first groups has a largest number of production rate values, and then takes the one among the first groups as a selected group. The step S212 also calculates an average value of the production rate values in the selected group, and takes the average value as the first steady state production rate value of the first steady state region.

On the other hand, in step S213, the production rate values comprised in the real-time streaming data are grouped into a plurality of second groups according to a plurality of non-overlapped rate intervals of a second data binning technique. Specifically, each of the non-overlapped rate intervals has a second interval length equal to the movement distance in the first data binning technique. When performing the grouping operation on the production rate values comprised in the real-time streaming data according to the non-overlapped rate intervals, the step S213 determines each production rate value falling within which one of the non-overlapped rate intervals, and then determines that the production rate value belongs to the second group corresponding to the one of the non-overlapped rate intervals according to the determination result.

Then, in step S214, a second steady state production rate value is calculated by the dispatching system according to the production rate values corresponding to a first portion of the second groups. Specifically, the step S214 first enables the dispatching system to determine a second steady state region according to other non-overlapped rate intervals except for the first steady state region. For example, the dispatching system may select one or more non-overlapped rate intervals corresponding to a largest (larger) number of production rate values, among other non-overlapped rate intervals except for the first steady state region, as the second steady state region. The step S214 then calculates an average value of the production rate values comprised in the second group(s) corresponding to the second steady state region, and takes the average value as the second steady state production rate value of the second steady state region.

It shall be appreciated that, when executing the step S211, the dispatching system also calculates the sum of the data (i.e., the sum of the production rate values) and the sum of squares of the data (i.e., the sum of squares of the production rate values) in each of the first groups in some embodiments. Additionally, when executing the step S213, the dispatching system also calculates the sum of the data (i.e., the sum of the production rate values) and the sum of squares of the data (i.e., the sum of squares of the production rate values) in each of the second groups. In those embodiments, the dispatching system further executes a step to determine a first steady state parameter according to the production rate values corresponding to the selected group among the first groups, determine a second steady state parameter according to the production rate values corresponding to the first portion of the second groups, and determine a third steady state parameter according to the production rate values corresponding to the second portion of the second groups. The first steady state parameters, the second steady state parameters and the third steady state parameters each comprise a probability value and a standard deviation.

It shall be appreciated that, the dispatching system performs operation on the real-time streaming data through a data classification method so as to determine the length of the overlapped rate intervals in this embodiment. The data classification method includes Bucket, Quantile and Optimal Binning Additionally, in some embodiments, the dispatching system may also execute the step S214 to further determine one or more other steady state regions (i.e., select other non-overlapped rate intervals except for the first steady state region and the second steady state region) and calculate an average value of the production rate values comprised in each of the other steady state regions, thereby obtaining the steady state production rate value of each of the other steady state regions. Thereafter, step S215 is executed to enable the dispatching system to record the first steady state production rate value, the second steady state production rate value and other steady state production rate values (if any) in the database of the dispatching system.

After executing the steps S211 to S215 on each of the real-time streaming data (i.e., after the step S202 is completely executed) in the dispatching method, a plurality of steady state production rate values of each of the real-time streaming data are obtained. Next, in step S203, a dispatching message of a to-be-produced product is determined by the dispatching system according to a portion of the first steady state production rate values, a portion of the second steady state production rate values and a portion of the third steady state production rate values (if any), and the dispatching message comprises a working bench, a dispatching sequence and an estimated production capacity value corresponding to the to-be-produced product.

Specifically, the step S203 is executed to enable the dispatching system to select one of the product specifications as a reference specification of the to-be-produced product (e.g., select the same or the most similar production specification as the reference specification) by comparing the product specifications recorded in the database with a to-be-produced product specification of the to-be-produced product. The aforesaid product specifications may include the size, the material of the product or other product attributes/features. In some embodiments, the reference specification is determined in the step S203 by a regression method, an interpolation method or other similarity analysis methods. The step S203 may also determine a first estimated production rate value, a second estimated production rate value and a third estimated production rate value of the to-be-produced product on each of the working benches according to the first steady state production rate values, the second steady state production rate values and the third steady state production rate values corresponding to the reference specification. Thereafter, the step S203 further determines the dispatching message according to the first estimated production rate values, the second estimated production rate values and the third estimated production rate values.

Specifically, in this embodiment, the step S203 may perform the following operations on each of the working benches: (a) calculating an estimated production time of the to-be-produced product on the working bench according to the first estimated production rate value, the second estimated production rate value and the third estimated production rate value of the working bench, and (b) determining an estimated completion time point according to the estimated production time, a start production time point and a setup time of the working bench. Thereafter, the step S203 further determines a corresponding working bench of the to-be-produced product according to the estimated completion time point.

In some embodiments, after the step S203, the dispatching system may further execute another step (not shown) to estimate a plurality of estimated production times and a plurality of estimated completion time points of each of a plurality of to-be-produced products according to the steady state production rate values and the steady state parameters. Then, the dispatching system performs operation on the estimated production times and the estimated completion time points by executing another estimation method (e.g., through the aforesaid equation (6)), thereby obtaining the working bench, the dispatching sequence and the estimated production capacity value corresponding to each of the to-be-produced products. The estimation method may be a mixed integer programming model or any of various heuristic algorithms (e.g., a genetic algorithm).

In addition to the aforesaid steps, the second embodiment can also execute all the operations and steps set forth in the first embodiment, have the same functions and deliver the same technical effects as the first embodiment. How the second embodiment executes these operations and steps, has the same functions and delivers the same technical effects as the first embodiment will be readily appreciated by those of ordinary skill in the art based on the explanation of the first embodiment, and thus will not be further described herein.

The dispatching method described in the second embodiment may be implemented by a computer program product having a plurality of codes. The computer program product may be a file that can be transmitted over the network, or may be stored into a non-transitory computer readable storage medium. After the codes of the computer program product are loaded into an electronic computing apparatus (e.g., the dispatching system of the first embodiment), the computer program product executes the dispatching method as described in the second embodiment. The non-transitory computer readable storage medium may be an electronic product, e.g., a read only memory (ROM), a flash memory, a floppy disk, a hard disk, a compact disk (CD), a mobile disk, a tape, a database accessible to networks, or any other storage medium with the same function and well known to those of ordinary skill in the art.

It shall be appreciated that, in the specification of the present invention, terms "first", "second" or "third" used in the nouns modified by "first", "second" or "third" are only used to mean that these nouns are different nouns. For example, in the specification of the present invention, the terms "first", "second" and "third" used in the first steady state production rate values, the second steady state production rate values, and the third steady state production rate values are only used to mean that these steady state production rate values are different steady state production rate values.

According to the above descriptions, the dispatching technology (including the system and the method) provided in the present invention performs the grouping operation on the real-time streaming data regarding a plurality of products being produced by a plurality of working benches according to different rate intervals defined using two data binning techniques (i.e., a plurality of overlapped rate intervals and a plurality of non-overlapped rate intervals). Through the aforesaid grouping operation, a plurality of steady state production rate values of each product specification in different steady state regions (i.e., levels) on each working bench can be obtained. Thereafter, the dispatching technology of the present invention can select corresponding different levels of steady state production rate values for evaluation and dispatching according to the to-be-produced product specification of the to-be-produced product.

The dispatching technology provided in the present invention updates the number of data, the sum of data, and the sum of squares of data in the groups according to the production rate values comprised in the real-time streaming data when performing the grouping operation on the real-time streaming data. Then, the dispatching technology provided in the present invention may select a first group having a largest number of the production rate values as a selected group, and take an average value of the production rate values corresponding to the selected group as a first steady state production rate value. Additionally, the present invention may take an average value of the production rate values corresponding to one or more second groups having the largest number of production rate values as a second steady state production rate value. Through the data binning techniques, the probability of comprising abnormal production rate values in a main steady state region is eliminated, and moreover, the accuracy of the steady state production rate values of each product specification in different steady state regions (i.e., levels) on each working bench can be further improved. Therefore, the dispatching technology of the present invention can further determine the dispatching relationships between one or more to-be-produced products and each working bench based on the steady state production rate values and steady state parameters of each product specification in different steady state regions (i.e., levels) on each working bench that are recorded in the database. According to the dispatching relationships, the dispatching system/method of the present invention can further estimate the production rate and time of a plurality of to-be-produced products, and optimize the product dispatching and the manpower scheduling of the whole factory in combination with real-time monitoring of the production status of the products.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A dispatching system based on multiple levels of steady state production rates in a plurality of working benches, comprising:

a database; and a processor electrically connected to the database, being configured to receive a plurality of real-time streaming data regarding a plurality of products being produced by the working benches, wherein each of the plurality of real-time streaming data corresponding to one of the working benches and one of a plurality of product specifications, and the processor being configured to perform the following operations on each of the plurality of real-time streaming data:

grouping a plurality of production rate values comprised in the real-time streaming data into a plurality of first groups according to a plurality of overlapped rate intervals of a first data binning technique, and calculating a first steady state production rate value according to the production rate values corresponding to a selected group among the first groups, wherein each of the overlapped rate intervals has a first interval length, the overlapped rate intervals present a sequence, every two adjacent ones of the overlapped rate intervals in this sequence are overlapped with each other by a movement distance, grouping the production rate values comprised in the real-time streaming data into a plurality of second groups according to a plurality of non-overlapped rate intervals of a second data binning technique, and calculating a second steady state production rate value according to the production rate values corresponding to a first portion of the second groups, wherein each of the non-overlapped rate intervals has a second interval length equal to the movement distance, wherein the processor further determines a dispatching message of a to-be-produced product according to a portion of the first steady state production rate values and a portion of the second steady state production rate values, and the dispatching message comprises a working bench corresponding to the to-be-produced product, wherein the processor further dispatches the to-be-produced product to the working bench indicated in the dispatching message for production.

2. The dispatching system of claim 1, wherein the processor further performs the following operations on each of the real-time streaming data:

determining a third steady state production rate value according to the production rate values comprised in a second portion of the second groups;

wherein the processor determines the dispatching message of the to-be-produced product according to the portion of the first steady state production rate values, the portion of the second steady state production rate values and a portion of the third steady state production rate values.

3. The dispatching system of claim 2, wherein the dispatching message further comprises a dispatching sequence and an estimated production capacity value corresponding to the to-be-produced product.

4. The dispatching system of claim 2, wherein the database records the product specifications, the first steady state production rate values, the second steady state production rate values and the third steady state production rate values, each of the first steady state production rate values corresponds to one of the working benches and one of the product specifications, each of the second steady state production rate values corresponds to one of the working benches and one of the product specifications, and each of the third steady state production rate values corresponds to one of the working benches and one of the product specifications.

5. The dispatching system of claim 4, wherein the processor determines the dispatching message by performing the following operations:

selecting one of the product specifications as a reference specification of the to-be-produced product by comparing the product specifications recorded in the database with a to-be-produced product specification of the to-be-produced product;

determining a first estimated production rate value, a second estimated production rate value and a third estimated production rate value of the to-be-produced product on each of the working benches according to the first steady state production rate values, the second steady state production rate values and the third steady state production rate values corresponding to the reference specification; and determining the dispatching message according to the first estimated production rate values, the second estimated production rate values and the third estimated production rate values.

6. The dispatching system of claim 5, wherein the processor selects the reference specification according to a regression method, an interpolation method and a similarity analysis method.

7. The dispatching system of claim 5, wherein the processor further performs the following operations on each of the plurality of real-time streaming data:

determining a first steady state parameter according to the production rate values corresponding to the selected group among the first groups, determining a second steady state parameter according to the production rate values corresponding to the first portion of the second groups, and determining a third steady state parameter according to the production rate values corresponding to the second portion of the second groups;

wherein the first steady state parameters, the second steady state parameters and the third steady state parameters each comprise a probability value and a standard deviation.

8. The dispatching system of claim 7, wherein the processor determines the dispatching message by performing the following operations:

performing the following operations on each of the working benches:

calculating an estimated production time of the to-be-produced product on the working bench according to the first estimated production rate value, the second estimated production rate value and the third estimated production rate value of the working bench, and determining an estimated completion time point according to the estimated production time, a start production time point and a setup time of the working bench, and determining a corresponding working bench comprised in the dispatching message of the to-be-produced product according to the estimated completion time points.

9. A dispatching method based on multiple levels of steady state production rates in a plurality of working benches, being adapted for a dispatching system, the dispatching method comprising:

(a) receiving a plurality of real-time streaming data regarding a plurality of products being produced by the working benches, wherein each of the plurality of real-time streaming data corresponding to one of the working benches and one of a plurality of product specifications;

(b) executing the following steps on each of the plurality of real-time streaming data:

(b1) grouping a plurality of production rate values comprised in the real-time streaming data into a plurality of first groups according to a plurality of overlapped rate intervals of a first data binning technique, wherein each of the overlapped rate intervals has a first interval length, the overlapped rate intervals present a sequence, and every two adjacent ones of the overlapped rate intervals in this sequence are overlapped with each other by a movement distance;

(b2) calculating a first steady state production rate value according to the production rate values corresponding to a selected group among the first groups;

(b3) grouping the production rate values comprised in the real-time streaming data into a plurality of second groups according to a plurality of non-overlapped rate intervals of a second data binning technique, wherein each of the non-overlapped rate intervals has a second interval length equal to the movement distance; and (b4) calculating a second steady state production rate value according to the production rate values corresponding to a first portion of the second groups;

(c) determining a dispatching message of a to-be-produced product according to a portion of the first steady state production rate values and a portion of the second steady state production rate values, wherein the dispatching message comprises a working bench corresponding to the to-be-produced product; and (d) dispatching the to-be-produced product to the working bench indicated in the dispatching message for production.

10. The dispatching method of claim 9, wherein the step (b) further comprises executing the following steps on each of the plurality of real-time streaming data:

determining a third steady state production rate value according to the production rate values comprised in a second portion of the second groups, wherein the step (c) determines the dispatching message of the to-be-produced product according to the portion of the first steady state production rate values, the portion of the second steady state production rate values and a portion of the third steady state production rate values.

11. The dispatching method of claim 10, wherein the dispatching message further comprises a dispatching sequence and an estimated production capacity value corresponding to the to-be-produced product.

12. The dispatching method of claim 10, further comprising:

recording the product specifications, the first steady state production rate values, the second steady state production rate values and the third steady state production rate values in a database;

wherein each of the first steady state production rate values corresponds to one of the working benches and one of the product specifications, each of the second steady state production rate values corresponds to one of the working benches and one of the product specifications, and each of the third steady state production rate values corresponds to one of the working benches and one of the product specifications.

13. The dispatching method of claim 12, wherein the step (c) comprises:

(c1) selecting one of the product specifications as a reference specification of the to-be-produced product by comparing the product specifications recorded in the database with a to-be-produced product specification of the to-be-produced product;

(c2) determining a first estimated production rate value, a second estimated production rate value and a third estimated production rate value of the to-be-produced product on each of the working benches according to the first steady state production rate values, the second steady state production rate values and the third steady state production rate values corresponding to the reference specification; and (c3) determining the dispatching message according to the first estimated production rate values, the second estimated production rate values and the third estimated production rate values.

14. The dispatching method of claim 13, wherein the step (c3) selects the reference specification according to a regression method, an interpolation method and a similarity analysis method.

15. The dispatching method of claim 13, wherein the step (b) further performs the following operations on each of the plurality of real-time streaming data:

determining a first steady state parameter according to the production rate values corresponding to the selected group among the first groups;

determining a second steady state parameter according to the production rate values corresponding to the first portion of the second groups; and determining a third steady state parameter according to the production rate values corresponding to the second portion of the second groups;

wherein the first steady state parameters, the second steady state parameters and the third steady state parameters each comprise a probability value and a standard deviation.

16. The dispatching method of claim 15, wherein the step (c) further comprises:

performing the following operations on each of the working benches:

calculating an estimated production time of the to-be-produced product on the working bench according to the first estimated production rate value, the second estimated production rate value and the third estimated production rate value of the working bench, and determining an estimated completion time point according to the estimated production time, a start production time point and a setup time of the working bench, and determining a corresponding working bench of the to-be-produced product according to the estimated completion time point.

* * * * *